United States Patent
Okura

(10) Patent No.: US 7,721,442 B2
(45) Date of Patent: May 25, 2010

(54) WIPER BLADE PARTIAL PRESSURE SETTING METHOD

(75) Inventor: Shigeki Okura, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 971 days.

(21) Appl. No.: 10/587,455

(22) PCT Filed: Feb. 10, 2004

(86) PCT No.: PCT/JP2004/001434

§ 371 (c)(1), (2), (4) Date: Jul. 27, 2006

(87) PCT Pub. No.: WO2005/075267

PCT Pub. Date: Aug. 18, 2005

(65) Prior Publication Data

US 2007/0157411 A1    Jul. 12, 2007

(51) Int. Cl.
| B60S 1/38 | (2006.01) |
| B60S 1/32 | (2006.01) |
| B21D 5/00 | (2006.01) |
| B21D 7/12 | (2006.01) |

(52) U.S. Cl. .................. 29/897.2; 29/428; 15/250.451; 15/250.001; 72/362; 72/379.2

(58) Field of Classification Search .............. 15/250.43, 15/250.44, 250.451, 250.201, 250.001, 250.361; 29/897.2, 428; 72/362, 379.2
See application file for complete search history.

(56) References Cited

U.S. PATENT DOCUMENTS 2,767,419 A * 10/1956 Horton .................. 15/250.451
3,192,551 A * 7/1965 Appel .................. 15/250.43
4,028,770 A * 6/1977 Appel .................. 15/250.43
4,090,272 A * 5/1978 Porter .................. 15/250.44

(Continued)

FOREIGN PATENT DOCUMENTS

EP    0589680 A    3/1994

(Continued)

OTHER PUBLICATIONS

*Journal of Nippondenso Technical Disclosure* No. 83-030 (with English translation) "Wiper Blade Structure", Mar. 15, 1992.

(Continued)

*Primary Examiner*—Gary K Graham
(74) *Attorney, Agent, or Firm*—Posz Law Group, PLC

(57) ABSTRACT

A backing of a wiper blade (53) is virtually divided into a plurality of regions in a longitudinal direction of the backing. A wiping area (B) of the wiper blade (53) in a glass surface (50a) is discretized in a wiping direction (x direction) of the wiper blade (53) and in a longitudinal direction (z direction) of the wiper blade (53). A curvature of each of the plurality of virtually divided regions of the backing is set in such a manner that a sum of variation differences of contact pressures (Fyij) at respective discretized points (Pij) is minimized. With such a wiper blade partial pressure setting method, a wiping performance of the wiper blade (53) can be easily and reliably improved over the entire wiping area of the wiping surface.

6 Claims, 8 Drawing Sheets

U.S. PATENT DOCUMENTS

| | | | | |
|---|---|---|---|---|
| 4,336,625 A * | 6/1982 | Maiocco | | 15/250.451 |
| 4,343,063 A * | 8/1982 | Batt | | 15/250.451 |
| 4,438,543 A | 3/1984 | Noguchi et al. | | |
| 4,807,326 A * | 2/1989 | Arai et al. | | 15/250.43 |
| 5,325,564 A | 7/1994 | Swanepoel | | |
| 6,266,843 B1 * | 7/2001 | Doman et al. | | 15/250.201 |
| 7,013,547 B2 * | 3/2006 | Lenzen et al. | | 29/417 |
| 2002/0116973 A1 * | 8/2002 | Wilhelm et al. | | 72/166 |

FOREIGN PATENT DOCUMENTS

| | | |
|---|---|---|
| EP | 1132267 A2 | 9/2001 |
| JP | A-57-055244 | 4/1982 |
| JP | A-05-301562 | 11/1993 |
| JP | A-2001-158333 | 3/2001 |

OTHER PUBLICATIONS

*Journal of Nippondenso Technical Disclosure* No. 102-038 (with English translation) "Vehicle Wiper Blade", May 15, 1995.

\* cited by examiner

| SYMBOLS | DATA | REMARKS |
|---|---|---|
| EI | $4.4 \times 10^{-2}$ (Nm²) | |
| n | 11 | 50mm PITCHES |
| Fy | 9.2 (N) | |
| $n_x$ | 172 | 1° PITCHES × 2 (TO AND FRO) |
| $n_z$ | 110 | 5mm PITCHES |

FIG. 6
| | REGION (DISTANCE FROM REAR END) | LEVER:FIG. 4(a) | LEVER:FIG. 4(b) |
|---|---|---|---|
| A1 | 0mm~50mm | STRAIGHT | -2189.41mm |
| A2 | 50mm~100mm | 1022.41mm | -839.23mm |
| A3 | 100mm~150mm | 681.86mm | -440.93mm |
| A4 | 150mm~200mm | 832.36mm | -385.26mm |
| A5 | 200mm~250mm | 589.84mm | -310.56mm |
| A6 | 250mm~300mm | 477.20mm | -331.55mm |
| A7 | 300mm~350mm | 630.51mm | -316.25mm |
| A8 | 350mm~400mm | 803.66mm | -404.14mm |
| A9 | 400mm~450mm | 688.07mm | -451.97mm |
| A10 | 450mm~500mm | 1355.44mm | -1039.89mm |
| A11 | 500mm~550mm | -8000.84mm | -2230.43mm |
FIG. 7
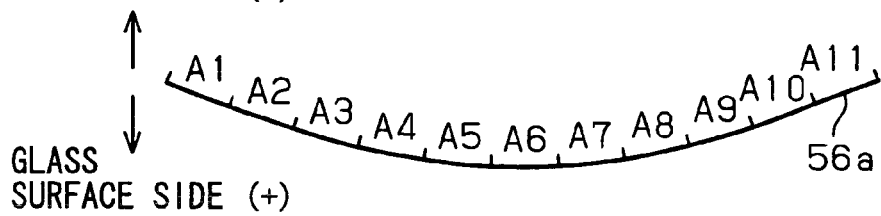
(a)
(b)

WIPER BLADE PARTIAL PRESSURE SETTING METHOD

TECHNICAL FIELD

The present invention relates to a wiper blade partial pressure setting method of a wiper blade that includes a backing for spreading an urging force, which is applied from a wiper arm toward a wiping surface, in a longitudinal direction of a blade rubber and also relates to such a wiper blade.

BACKGROUND ART

A wiper blade, which wipes raindrops and the like adhered to a front glass surface of a vehicle, is disclosed in, for example, Japanese Unexamined Patent Publication No. S57-55244.

The wiper blade disclosed in this document uses a tournament type lever assembly, which includes one primary lever, two secondary levers and two yokes. The primary lever is connected to a wiper arm. The secondary levers are rotatably connected to ends, respectively, of the primary lever. The yokes are rotatably connected to corresponding ends of the secondary levers, respectively. Six holding claws are provided to six points of the assembly, i.e., ends of the yokes and the remaining ends of the secondary levers (ends other than the ends connected to the yokes) to hold the blade rubber. Backings, each of which has a length that is generally the same as that of the blade rubber, are installed to the blade rubber, and the blade rubber is held by the holding claws at the points where the backings are installed.

Each backing is made from a metal plate material and is formed into a straight shape (a linear shape) or a curved shape that has a predetermined curvature in the longitudinal direction thereof, and the backing has a resiliency in a plate thickness direction thereof. The urging force of the wiper arm is spread in the longitudinal direction of the blade rubber through the lever assembly and the backings, so that contact pressures of the blade rubber against the glass surface are unified in the longitudinal direction of the blade rubber.

A curvature of the front glass of the vehicle changes from one wiping angular position to a next wiping angular position of the wiper blade. The wiper blade, which wipes such a glass surface, is required to always follow the complicatedly curved glass surface and to achieve a good wiping performance.

However, in the case of the wiper blade recited in the above document, the load applied to each holding claw is set only by the space between the holding claws to adjust the contact pressure against the glass surface in the longitudinal direction of the blade rubber.

The adjustment of the contact pressure largely depends on the experience and sense of a skilled technician, and a result of the adjustment is checked through, for example, experiments. Thus, when the wiping performance over the entire wiping area of the glass surface, which continuously changes its curvature depending on the wiping angular position, needs to be improved, a large amount of time is required. Furthermore, such adjustment and setting merely achieve a satisfactory wiping performance, which is determined to be satisfactory in view of a product test standard, and do not necessarily achieves the best wiping performance.

The present invention is made to addresses the above disadvantages. Thus, it is an objective of the present invention to provide a wiper blade partial pressure setting method and a wiper blade, which can easily and reliably improve a wiping performance over an entire wiping area of a wiping surface.

DISCLOSURE OF THE INVENTION

In order to achieve the above objective, there is provided a wiper blade partial pressure setting method of the present invention for a wiper blade that included a backing, which is received in a blade rubber that wipes a wiping surface, wherein the backing spreads an urging force applied from a wiper arm toward the wiping surface in a longitudinal direction of the blade rubber to unify contact pressures of the blade rubber against the wiping surface, the wiper blade partial pressure setting method including: virtually dividing the backing into a plurality of regions in a longitudinal direction of the backing; discretizing a wiping area of the wiper blade in the wiping surface in a wiping direction of the wiper blade and in a longitudinal direction of the wiper blade; and setting at least one of a curvature and a rigidity of each of the plurality of virtually divided regions of the backing in such a manner that a sum of variation differences of the contact pressures at respective discretized points is minimized.

When the backing is produced according to the above setting method, the sum of the variation differences of the contact pressures of the blade rubber is minimized, and the contact pressures are most unified over the entire wiping area of the wiping surface. As a result, the wiping performance of the wiper blade over the entire wiping area can be reliably improved. Furthermore, when the above setting method is used, the wiping performance of the wiper blade can be easily improved through the computation by a person who is not a skilled technician.

In the above wiper blade partial pressure setting method, the sum of the variation differences of the contact pressures may be computed as a sum of absolute values of differences, each of which is between the contact pressure at a corresponding one of the discretized points and a reference value; or a sum of squares of the differences, each of which is between the contact pressure at the corresponding one of the discretized points and the reference value. In this way, complicated computation is not required, and the variation differences and the sum thereof can be easily obtained.

In the above wiper blade partial pressure setting method, it is possible to weight according to the variation differences of the contact pressures. In this way, a portion where the variation difference of the contact pressure is large (e.g., a portion where the contact pressure is significantly insufficient) can be reflected into the curvature setting of the backing, and thereby the wiping performance of that portion can be advantageously improved.

In the above wiper blade partial pressure setting method, the sum of the variation differences of the contact pressures is desirably a sum of the variation differences of the contact pressures computed for a round-trip of the wiper blade in the wiping direction. There are some portions, in which the contact pressure of the blade rubber differs between a forward stroke and a backward stroke in the reciprocal movement of the wiper blade. However, when the sum of the variation differences of the contact pressures is computed for the round-trip of the wiper blade, the wiping performance of the wiper blade over the entire wiping area can be reliably improved.

In the above wiper blade partial pressure setting method, the discretizing of the wiping area of the wiper blade desirably includes: dividing the wiping area into equal intervals in the wiping direction of the wiper blade; and dividing the wiping area into equal intervals in the longitudinal direction of the wiper blade. In this way, the discretization of the wiping area of the wiper blade can be easily performed without resulting in complication of the computation.

In the above wiper blade partial pressure setting method, the virtually dividing of the backing desirably includes dividing the backing into equal intervals in the longitudinal direction of the backing in this way, the setting of at least one of the curvature and the rigidity of each region of the backing can be easily performed, and the production of the backing is eased.

Furthermore, a wiper blade of the present invention includes a backing that is produced based on the above wiper blade partial pressure setting method; and a blade rubber that receives the backing and wipes a wiping surface, wherein the backing spreads an urging force applied from a wiper arm toward the wiping surface in a longitudinal direction of the blade rubber to unify contact pressures of the blade rubber against the wiping surface.

When the backing is produced based on the wiper blade partial pressure setting method, the sum of the variation differences of the contact pressures of the blade rubber is minimized, and the contact pressures are most unified over the entire wiping area of the wiping surface. Thus, the wiping performance of the wiper blade over the entire wiping area can be reliably improved. Furthermore, with the above setting method, the wiping performance of the wiper blade can be easily improved through the computation by a person who is not the skilled technician.

In the above wiper blade, the blade rubber, which receives the backing, may be held by a lever assembly connected to the wiper arm, wherein the lever assembly includes a plurality of levers, which are rotatable and constructed into a tournament style. That is, in the wiper blade, the blade rubber, which receives the backing, is held by the lever assembly, which includes the levers that are constructed into a tournament style. Even in the wiper blade, which includes such a lever assembly, the wiping performance can be easily and reliably improved over the entire wiping area of the wiping surface.

In the above wiper blade, the backing, which is received in the blade rubber, may be constructed to be directly connected to the wiper arm. Even in the wiper blade, in which the backing is directly connected to the wiper arm, the wiping performance can be easily and reliably improved over the entire wiping area of the wiping surface.

BRIEF DESCRIPTION OF THE DRAWINGS

FIGS. 4(a) and 4(b) are diagrams for describing the wiper blade partial pressure setting method according to the embodiment.

FIG. 6 is a diagram for describing the wiper blade partial pressure setting method according to the embodiment.

FIGS. 7(a) and 7(b) are diagrams for describing the wiper blade partial pressure setting method according to the embodiment.

BEST MODES FOR CARRYING OUT THE INVENTION

One embodiment of the present invention will be described with reference to the accompanying drawings.

Figure 8:
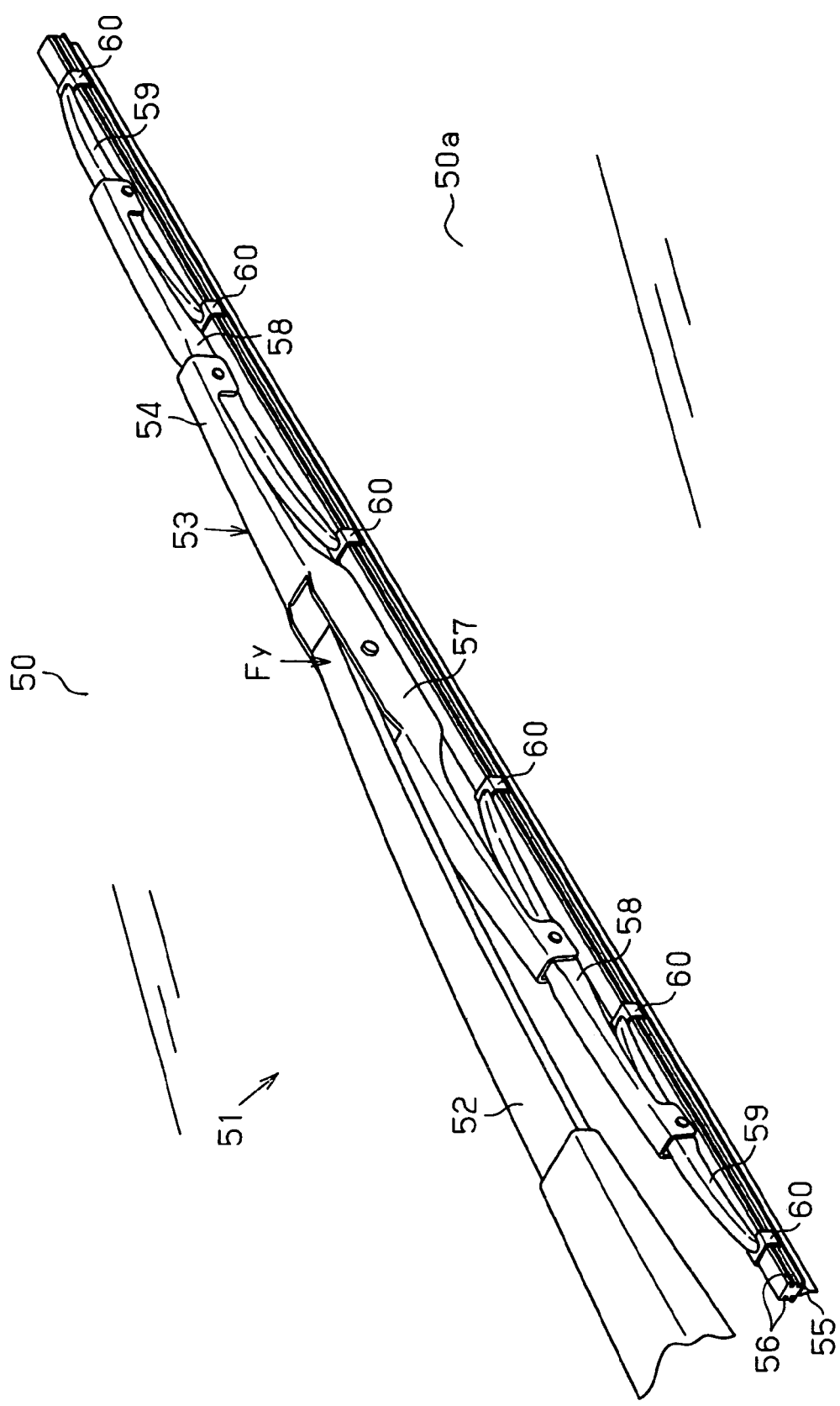
FIG. 8 is a perspective view showing a vehicle wiper according to the embodiment.

As shown in FIG. 8, a vehicle wiper 51, which wipers raindrops or the like adhered to a glass surface 50a of a front glass 50 of a vehicle, includes a wiper arm 52 and a wiper blade 53. A base end of the wiper arm 52 is fixed to a pivot shaft (not shown), which is reciprocally rotated within a predetermined angle by a wiper motor (not shown). The wiper arm 52 is reciprocally swung upon the reciprocal rotation of the pivot shaft. The wiper blade 53 is rotatably connected to a distal end of the wiper arm 52. Furthermore, a spring (not shown), which applies an urging force for urging the wiper blade 53 against the glass surface 50a, is installed in the wiper arm 52.

Figure 9:
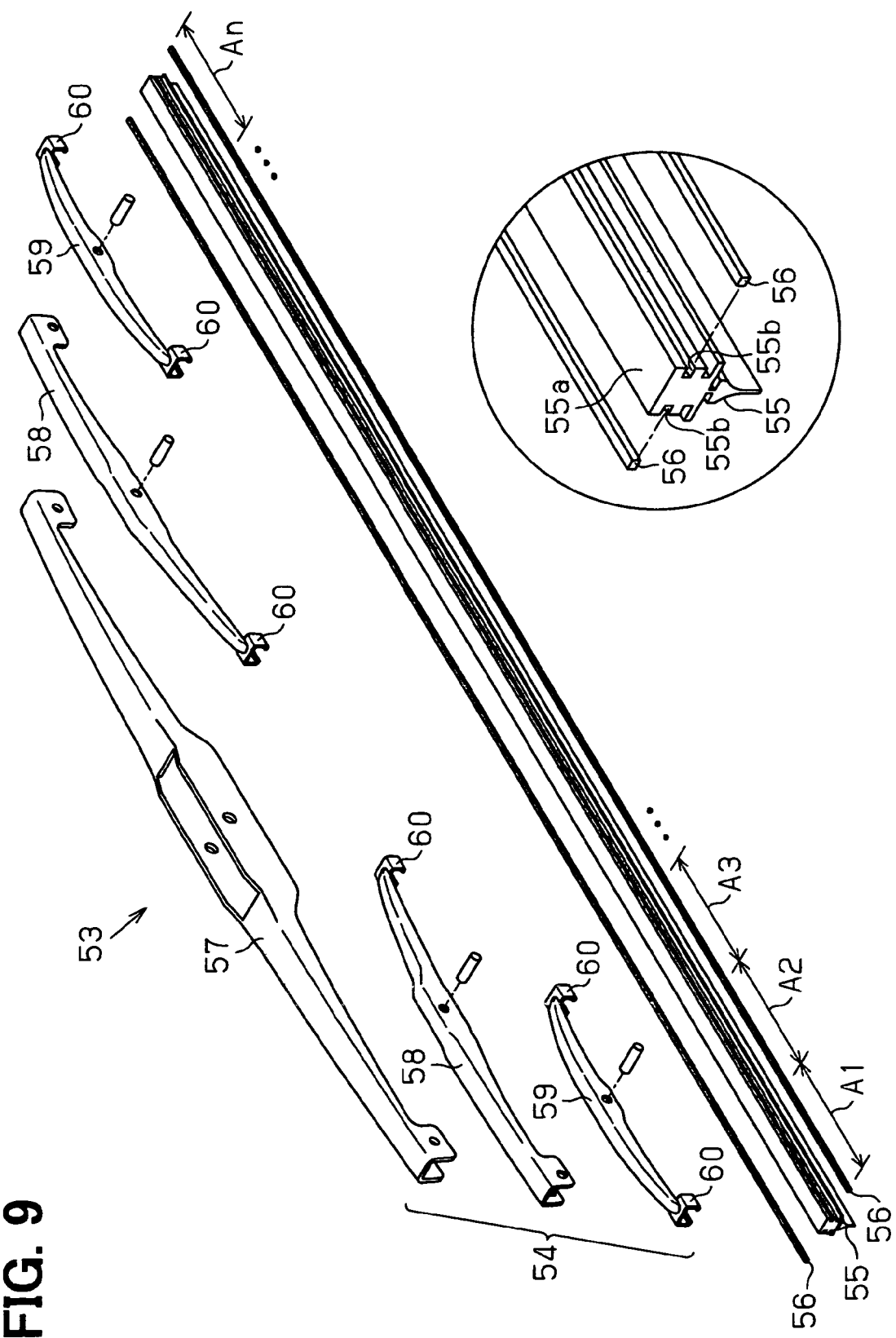
FIG. 9 is an exploded perspective view showing a wiper blade of the embodiment.

The wiper blade 53 includes a lever assembly 54, a blade rubber 55 and backings 56. As shown in FIG. 9, the lever assembly 54 has a tournament type structure, which includes one primary lever 57, two secondary levers 58 and two yokes 59. The primary lever 57 is connected to the wiper arm 52. The secondary levers 58 are rotatably connected to the ends, respectively, of the primary lever 57. Each yoke 59 is rotatably connected to one end of a corresponding one of the secondary levers 58. Six holding claws 60 are provided to six points of the lever assembly 54, i.e., to the opposed ends of the yokes 59 and the remaining ends of the secondary levers 58 (ends other than the ends connected to the yokes 59) to hold the blade rubber 55. That is, the blade rubber 55 is supported relative to the lever assembly 54 at the six points.

The blade rubber 55 includes a base 55a, which is held by the holding claws 60. The base 55a is provided to extend in the longitudinal direction of the blade rubber 55. The pair of backings 56, each of which has a length that is substantially the same as that of the base 55a, is installed to the base 55a in such a manner that the backings 56 are received in installation grooves 55b, which are provided to the opposed lateral sides of the base 55a. Each backing 56 is made of a metal plate material, which has a spring property. The backing 56 has a resiliency in a plate thickness direction. The base 55a, to which the backings 56 are installed, is held by the holding claws 60, and thereby the blade rubber 55 is held relative to the lever assembly 54. The urging force of the wiper arm 52 is spread by the lever assembly 54 and the backings 56 in the longitudinal direction of the blade rubber 55, so that contact pressures of the blade rubber 55 against the glass surface 50a are unified in the longitudinal direction of the blade rubber 55.

In the wiper blade 53 of the above construction, the shape of the primary lever 57, the shapes of the secondary levers 58, the shapes of the yokes 59, the number of the secondary levers 58, the number of the yokes 59 and the length of the blade rubber 55 and the backings 56 may be changed based on the size of the front glass 50.

According to the present embodiment, in the wiper blade 53 of the above construction, each backing 56 is virtually divided into a plurality of regions A1-An (the number of the regions is n) of the equal intervals in the longitudinal direction of the backing 56. A curvature (a radius of curvature) is changed in the respective regions A1-An based on the structure of the lever assembly 54 (e.g., the number of the levers 57, the number of the levers 58, the number of the yokes 59 and the interval of the holding claws 60) and the curved shape of the entire wiping area of the glass surface 50a. In the present embodiment, the curvature is changed in the respective longitudinal regions A1-An of the backing 56, so that the contact pressures of the blade rubber 55 against the glass surface 50a are unified, and thereby the wiping performance of the wiper blade 53 over the entire wiping area of the glass surface 50a is improved.

Now, the setting method of the curvature (the radius of curvature) the respective regions A1-An of the backing 56 will be described.

Figure 1:
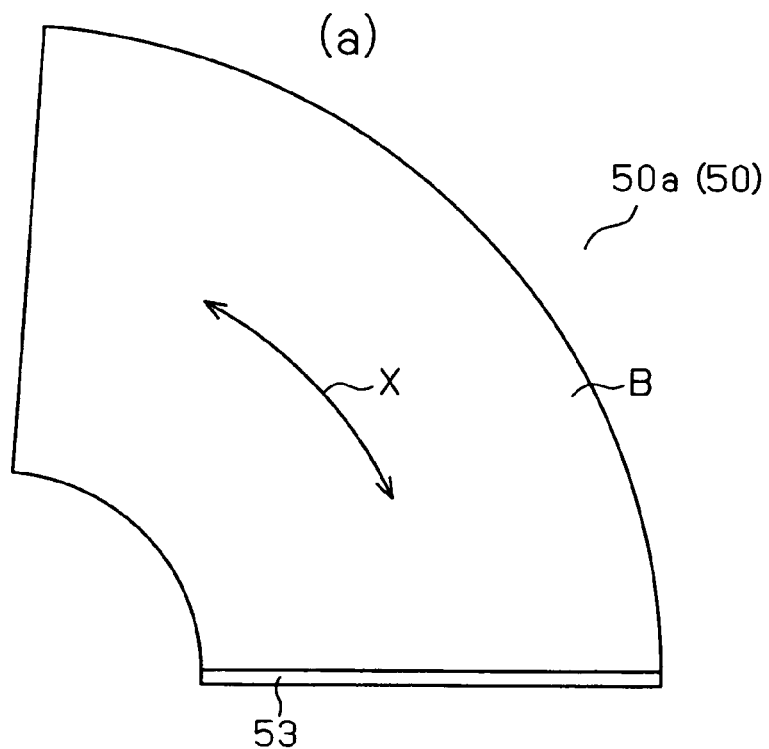
FIGS. 1(a) and 1(b) are diagrams for describing a wiper blade partial pressure setting method according to an embodiment.
Figure 1:
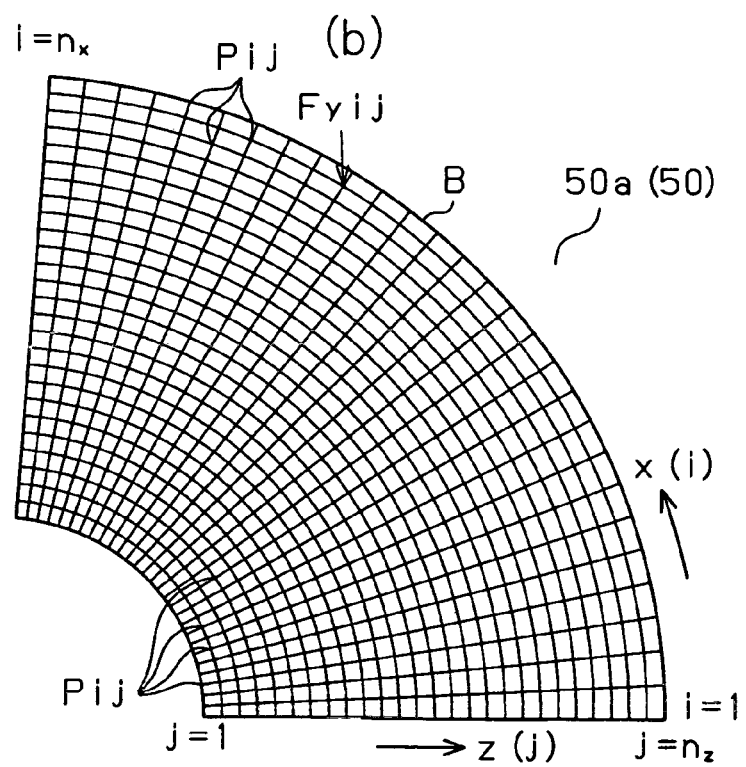

First, with reference to FIG. 1(a), the entire wiping area B of the wiper blade 53 in the glass surface 50a of the front glass 50 is discretized in such a manner that the entire wiping area B is divided by nx into equal intervals (equal angular intervals) in the wiping direction (x direction) of the wiper blade 53 and is also divided by nz into equal intervals in the longitudinal direction (z direction) of the wiper blade 53, as shown in FIG. 1(b). Coordinate data (three dimensional position data) of each discretized point Pij is obtained. The curved shape of the glass surface 50a can be recognized based on the coordinate data.

Furthermore, the configuration data of the desirable lever assembly 54 (the connection configurations of the primary lever 57, the secondary levers 58 and the yokes 59 as well as the number and intervals of the holding claws 60 (fulcrums)), the urging force Fy, which is applied from the wiper arm 52 to the wiper blade 53, and the flexural rigidity EI of the backing 56 are obtained as the design conditions. Then, these design conditions are set as fixed values, and the curvature (the radius of curvature) of each region A1-An of the backing 56 is set as a design variable. As the initial condition, the shape of the backing 56 is temporarily set as the straight shape (the linear shape).

Figure 2:
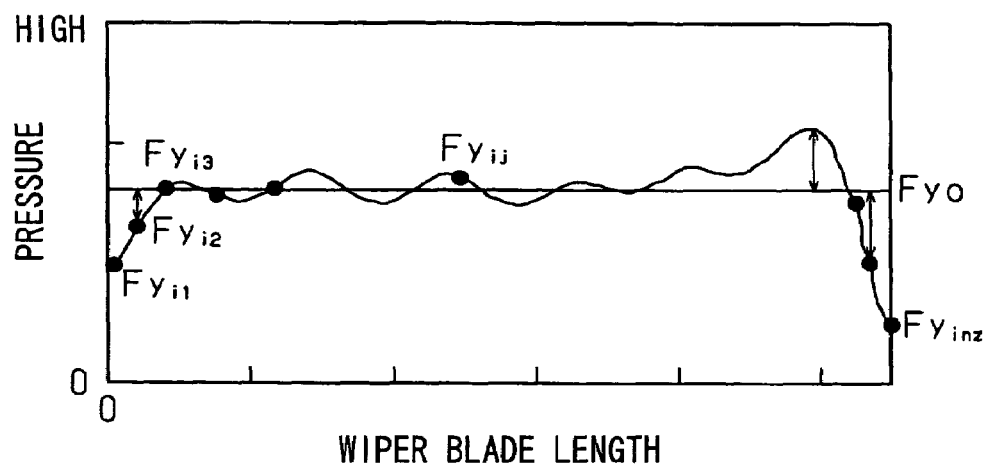
FIG. 2 is a diagram for describing the wiper blade partial pressure setting method according to the embodiment.

Next, the contact pressure Fyij of the blade rubber 55 at each point Pij under these design conditions is obtained. Here, FIG. 2 shows the contact pressure Fyij in the longitudinal direction of the blade rubber 55 in a predetermined point of the wiper blade 53. Then, the design parameter (in this instance, the design parameter being the curvature of each region A1-An of the backing 56) is changed through use of the following "Equation 1" or "Equation 2", so that the contact pressure Fyij of the blade rubber 55 at each point Pij is changed, and thereby an objective function f, which is defined as a sum of variation differences of the contact pressures Fyij at the discretized points Pij, is minimized (f→min), that is, a value of f is minimized. In this way, the curvature of each region A1-An of the backing 56 at the time of f→min is obtained as the most appropriate curvature.

$$f = \sum_{i=1}^{n_x} \sum_{j=1}^{n_z} w(Fyij)|Fyij - Fy0| \quad \text{Equation 1}$$

$$f = \sum_{i=1}^{n_x} \sum_{j=1}^{n_z} w(Fyij)(Fyij - Fy0)^2 \quad \text{Equation 2}$$

When f→min is achieved, i.e., when the value of f is minimized, the contact pressures Fyij of the blade rubber 55 are most unified over the entire wiping area B. When the backings 56 are produced based on the result of the above computations, the wiping performance of the wiper blade 53 over the entire wiping area B is reliably improved.

Here, Fy0 of each above equation is a reference value. Normally, an average value of the contact pressures Fyij of the blade rubber 55 or the design value Fy/nz (the value, which is obtained by dividing the urging force Fy applied from the wiper arm 52 to the wiper blade 53 by the number of divisions nz of the blade 53 in the longitudinal direction (z direction)) is used as the reference value Fy0. In "Equation 1", there is obtained a sum of absolute values of differences, each of which is between the contact pressure Fyij at the corresponding one of the discretized points Pij and the constant Fy0. In "Equation 2", there is obtained a sum of squares of the differences, each of which is between the contact pressure Fyij at the corresponding one of the discretized points Pij and the constant Fy0.

Figure 3:
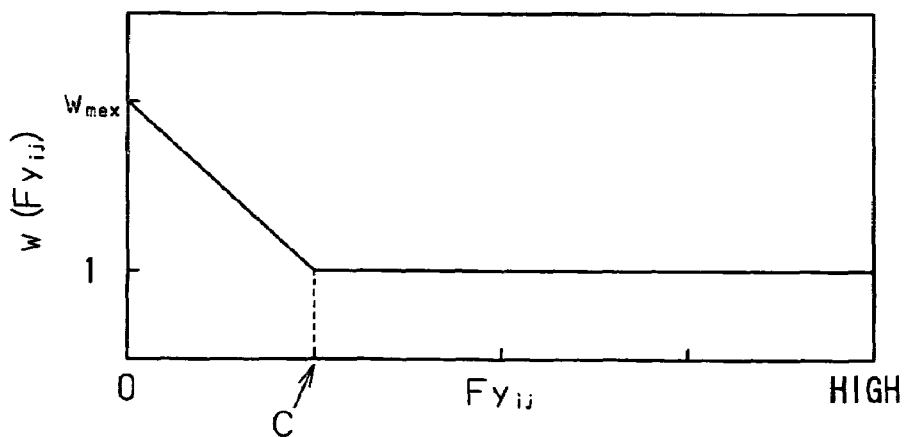
FIG. 3 is a diagram for describing the wiper blade partial pressure setting method according to the embodiment.

In the above equations, w(Fyij) is a weighting function. Normally, w(Fyij) is set to be 1, i.e., (Fyij)=1 but may be changed in some cases. For example, as shown in FIG. 3, in a case where the contact pressure Fyij of the blade rubber 55 becomes equal to or below a predetermined value C and thereby becomes insufficient, the weighting function w(Fyij) may be increased beyond 1 as the contact pressure Fyij decreases. In this way, a portion of the blade rubber 55 where the contact pressure Fyij of the blade rubber 55 is insufficient is largely reflected into the curvature setting of the backings 56, so that this portion of the blade rubber 55 where the contact pressure Fyij of the blade rubber is insufficient can be advantageously improved.

In the present embodiment, the setting of the curvature of each region A1-An of the backings 56 is performed through use of a personal computer (not shown). That is, the personal computer stores a computation software, such as "Equation 1" or "Equation 2". Thus, when the above conditions are inputted into the personal computer through, for example, a keyboard, the curvature of each region A1-An of the backings 56 is obtained.

Next, specific examples will be described using wiper blades 53a, 53b shown in FIGS. 4(a) and 4(b), respectively. The lever assembly 54 of each of the wiper blades 53a, 53b includes one primary lever 57 and two secondary levers 58. The four holding claws 60 are provided at four points at the ends of the secondary levers 58 to hold the blade rubber 55 having the backings 56a, 56b. That is, there is provided a lever assembly 54 of four point support type.

The length L of the wiper blade 53a, 53b, i.e., of the blade rubber 55 and of the backings 56 is 550 [mm], and the lever assembly 54 shown in FIG. 4(a) has the interval of 170 [mm] between the holding claws 60. That is, the protruding length of the blade rubber 55, which protrude from each of the holding claws 60 located at the opposed ends, is 20 [mm]. In contrast, the lever assembly 54 shown in FIG. 4(b) has the interval of 100 [mm] between the holding claws 60. That is, the protruding length of the blade rubber 55, which protrude from each of the holding claws 60 located at the opposed ends, is 125 [mm].

Figures 4, 5:
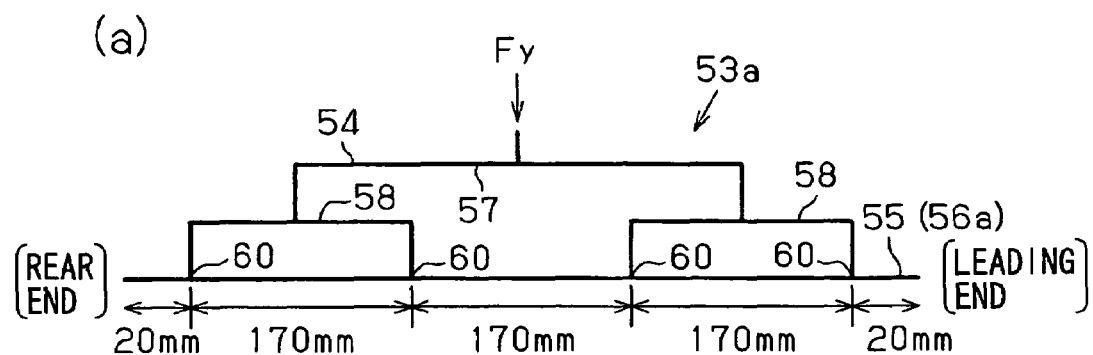
FIG. 5 is a diagram for describing the wiper blade partial pressure setting method according to the embodiment.

Next, as shown in FIG. 5, the flexural rigidity EI of each backing 56 is set to be $4.4 \times 10^{-2}$ [mm$^2$], and the urging force Fy applied from the wiper arm to the wiper blade 53a, 53b is set to be 9.2 [N], and the number n of divided longitudinal regions is set to be 11. That is, the interval (pitch) is set to be 50 [mm], and the backings 56 are virtually divided into eleven regions A1-A11.

Furthermore, the number nx of divisions of the wiper blade 53a, 53b in the longitudinal direction (z direction) is set to be 110, that is, the interval (pitch) is set to be 5 [mm], and the number nz of divisions of the wiper blade 53a, 53b in the wiping direction (x direction) is set to be 172. The above setting is due to the following reason. That is, the wiping area B of the wiper blade 53a, 53b is set to be a range of 86 degrees, and the round-trip movement (here, one degree being chosen as a swing pitch angle) of the wiper blade 53a, 53b is taken into the consideration, so that the number nz of divisions becomes 86×2=172. Then, coordinate data (three dimensional position data) of each discretized point Pij is obtained.

Then, the above "Equation 1" or "Equation 2" is used based on these data, and the curvature (the radius of curvature) is changed in the respective regions A1-A11 of the backing 56, so that the contact pressure Fyij of the blade rubber 55 at each corresponding point Pij is changed, and thereby f→min is achieved, that is, the value of f is minimized.

Therefore, in the case of the wiper blade 53a shown in FIG. 4(a), the curvatures of the regions A1-A11 of the backing 56a at the time of achieving f→min are set as indicated in FIG. 6. Specifically, the curvatures of the regions A1-A11 of the backing 56a are set from the rear end to the leading end of the wiper blade 53a (from the left to the right in FIG. 1) as follows: straight in the region A1 (the absolute value of equal to or greater than 1000 [mm] being regarded as "straight"), 1022.41 [mm] in the region A2, . . . , and −8000.84 [mm] in the region A11. In this case, when the curvature is the positive value, the backing 56a is curved to convex toward the glass surface 50a side. In contrast, when the curvature is the negative value, the backing 56a is curved to convex toward the counter-glass surface 50a side, i.e., the side opposite from the glass surface 50a.

Thus, as shown in FIG. 7(a), the entire backing 56a is curved to convex on the glass surface 50a side, and the degree of curvature of the center portion of the backing 56a is larger than that of end portions of the backing 56a. Then, the backing 56a is produced to curve based on the result of the computation, so that the wiping performance of the wiper blade 53a over the entire wiping area B is reliably improved.

Furthermore, in the wiper blade 53b shown in FIG. 4(b), the curvatures (the radiuses of curvature) of the regions A1-A11 of the backing 56b at the time of achieving f→min are set from the rear end to the leading end of the wiper blade 53b as follows: =2189.41 [mm] in the region A1, −839.23 [mm] in the region A2, . . . , and −2230.43 [mm] in the region A11.

Thus, as shown in FIG. 7(b), the entire backing 56b is curved to convex on the counter-glass surface 50a side, i.e., on the side opposite from the glass surface 50a, and the degree of curvature of the center portion of the backing 56b is larger than that of end portions of the backing 56b. Then, the backing 56b is produced to curve based on the result of the computation, so that the wiping performance of the wiper blade 53b over the entire wiping area B is reliably improved.

Next, advantages of the present embodiment will be described.

(1) In the present embodiment, each backing 56 (56a, 56b) is virtually divided into the multiple regions A1-An (A1-A11) in the longitudinal direction thereof. Then, the wiping area B of the wiper blade 53 (53a, 53b) over the glass surface 50a, which serves as the wiping surface, is discretized in the wiping direction (x direction) of the wiper blade 53 (53a, 53b) and in the longitudinal direction (z direction) of the wiper blade 53 (53a, 53b). Then, the curvature is set in the respective virtually divided regions A1-An (A1-A11) of the backing 56 (56a, 56b) such that the sum of variation differences of the contact pressures Fyij of the blade rubber 55 at the discretized points Pij (in the present embodiment, the sum of differences, each of which is between the contact pressure Fyij at the corresponding one of the discretized points Pij and the reference value Fy0, or the sum of squares of the differences, each of which is between the contact pressure Fyij at the corresponding one of the discretized points Pij and the reference value Fy0) is minimized. Thus, when the backings 56 (56a, 56b) are produced according to the above setting method, the sum of the variation differences of the contact pressures Fyij of the blade rubber 55 having the backings 56 (56a, 56b) is minimized, and the contact pressures Fyij are most unified over the entire wiping area B. Therefore, the wiping performance of the wiper blade 53 (53a, 53b) is reliably improved over the entire wiping area B. Furthermore, when the above setting method is used, the wiping performance of the wiper blade 53 (53a, 53b) can be easily improved through the computation by a person who is not the skilled technician.

(2) In the present embodiment, only the curvature in the respective regions A1-An (A1-A11) of the backing 56 (56a, 56b) is set, so that the wiping performance of the wiper blade 53 (53a, 53b) is improved over the entire wiping area B. In this way, even when the configuration of the lever assembly 54 is slightly changed, the wiping performance of the wiper blade 53 (53a, 53b) can be still improved. That is, the degree of freedom in terms of the configuration of the lever assembly 54 can be improved. Because of this, in some cases, the number of the secondary levers 58 and the yokes 59, which are the components of the lever assembly 54, may be reduced, so that the total number of the components of the lever assembly 54 can be advantageously reduced.

(3) In the present embodiment, the sum of the variation differences of the contact pressures Fyij is set to be the sum of absolute values of the differences, each of which is between the contact pressure Fyij at the corresponding one of the discretized points Pij and the reference value Fy0 (see Equation 1), or the sum of squares of the differences, each of which is between the contact pressure Fyij at the corresponding one of the discretized points Pij and the reference value Fy0. Thus, the variation differences and the sum thereof can be easily obtained without requiring complicated computations.

(4) Each of the above "Equation 1" and "Equation 2" has the weighting function w(Fyij), which adds the weight to the contact pressure Fyij. Thus, the weighting of the contact pressure Fyij is possible. Thereby, the portion having the large variation difference (e.g., the portion experiencing the relatively large shortage of the contact pressure Fyij) can be largely reflected into the curvature setting of the backings 56, and thereby the wiping performance of that portion can be advantageously improved.

(5) In the present embodiment, the sum of the variation differences of the contact pressures Fyij is the sum of the variation differences of the contact pressures Fyij computed for the round-trip of the wiper blade 53 (53a, 53b) in the wiping direction. A contact angle (an attach angle) of the blade rubber 55 relative to the glass surface 50a differs between the forward stroke and the backward stroke in the reciprocal movement of the wiper blade 53 (53a, 53b). Because of this difference, the contact pressure Fyij of the blade rubber 55 may slightly vary from one location to another location. Thus, when the sum of the variation differences of the contact pressures Fyij is computed for the round-trip of the wiper blade 53 (53a, 53b), the wiping performance of the wiper blade 53 (53a, 53b) over the entire wiping area B can be reliably improved.

(6) In the present embodiment, the discretization of the wiping area B of the wiper blade 53 (53a, 53b) is implemented such that the equal intervals are provided in the wiping direction of the wiper blade 53 (53a, 53b), and the equal intervals are provided in the longitudinal direction of the wiper blade 53 (53a, 53b). Thus, the discretization can be easily performed, and the computation is not complicated.

(7) In the present embodiment, the virtual regional divisions of the backing 56 (56a, 56b) is made at equal intervals in the longitudinal direction. Thus, the setting of the curvature in the respective regions A1-An (A1-A11) of the backing 56

(56a, 56b) can be easily performed, and also the production of the backing 56 (56a, 56b) can be easily performed.

The above embodiment can be modified as follows.

In the above embodiment, the wiper blade 53 (53a, 53b), which has the tournament type lever assembly 54, was described. However, the configuration of the lever assembly 54 (e.g., the number and the shapes of the secondary levers 58 and the yokes 59) is not limited to the above described one and can be modified in an appropriate way. Furthermore, a wiper blade 62 of FIGS. 10 and 11, which does not use the lever assembly 54, may be used.

Figure 10:
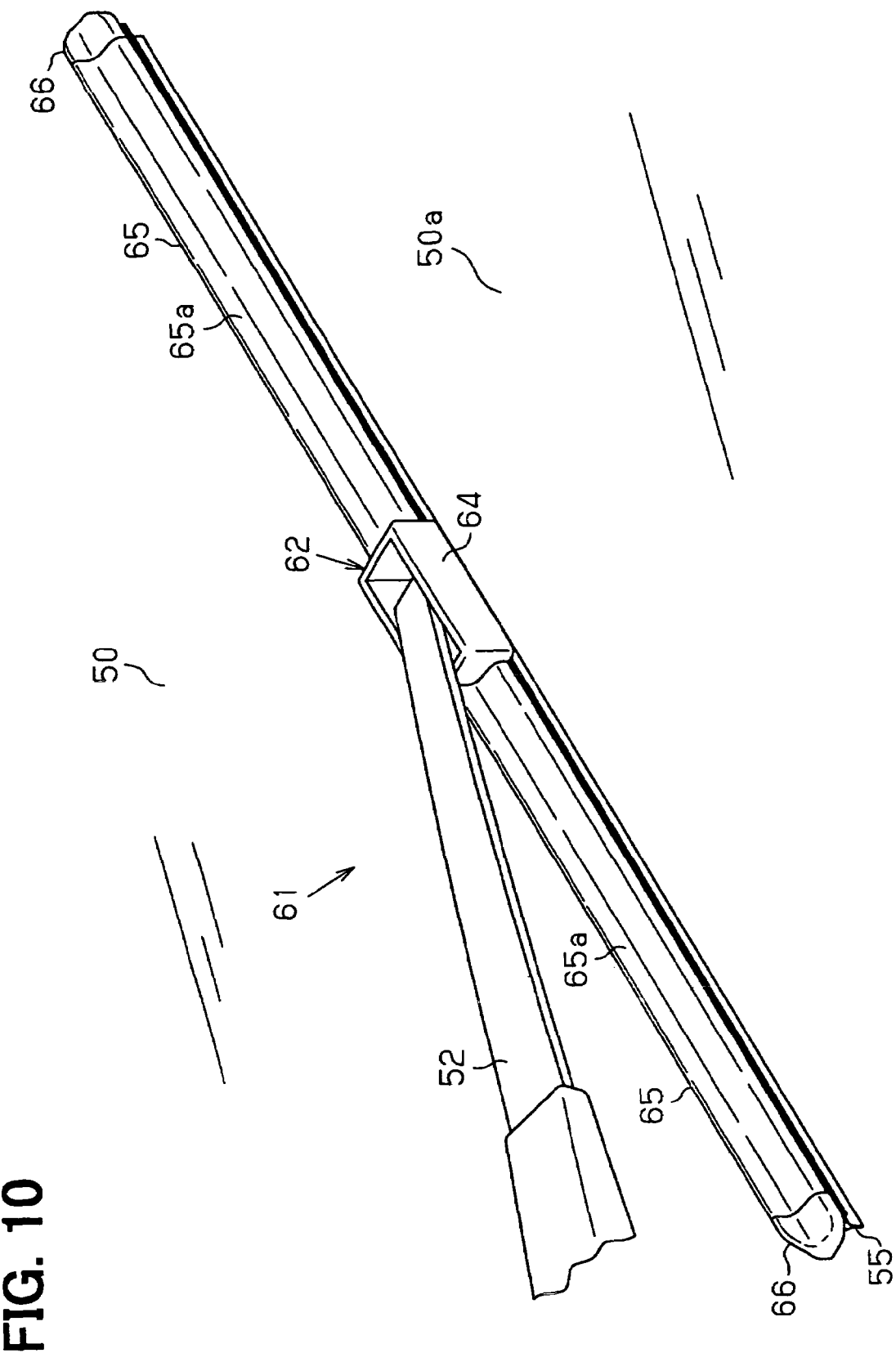
FIG. 10 is a perspective view showing another example of the vehicle wiper.
Figure 11:
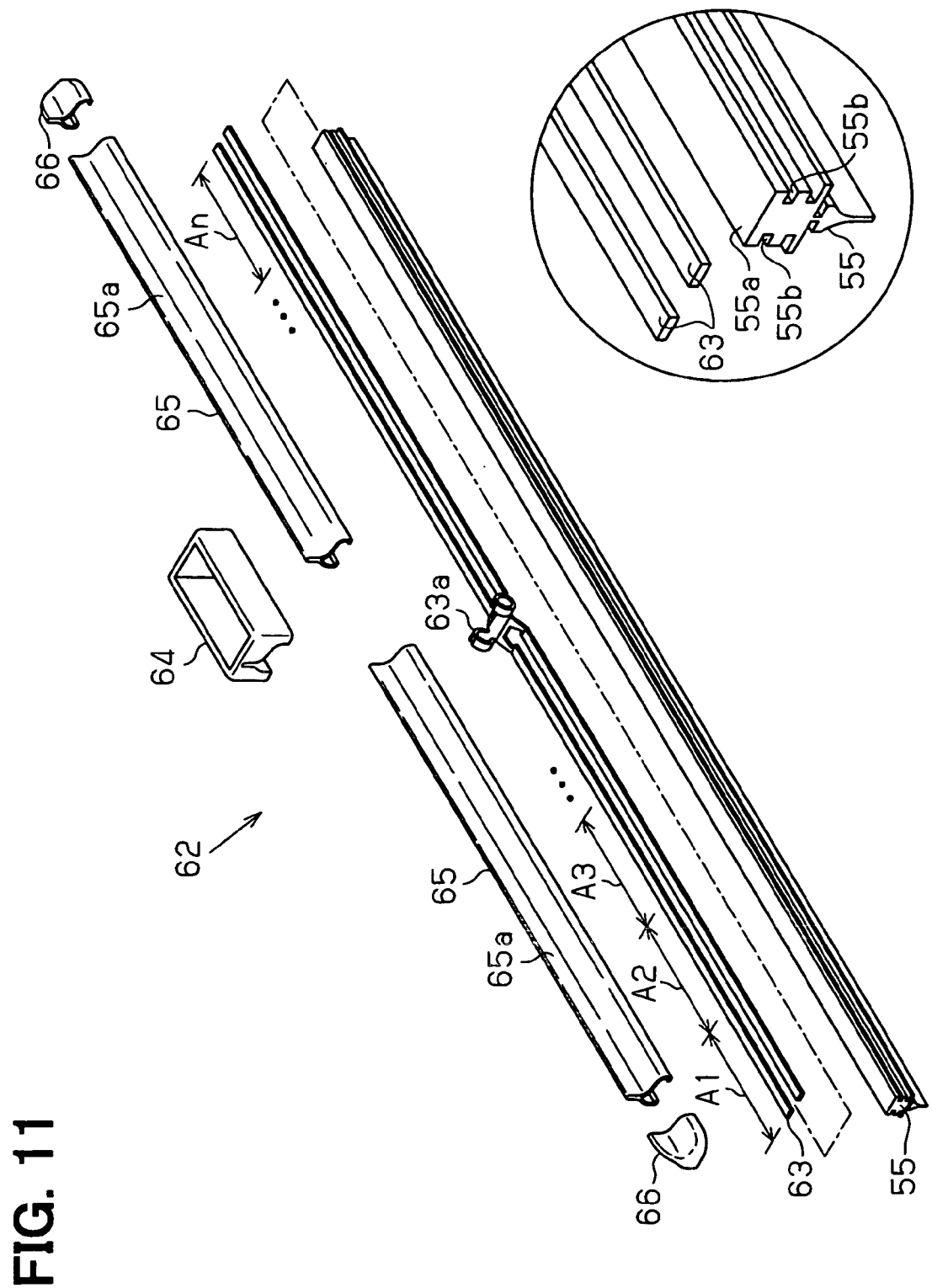
FIG. 11 is an exploded perspective view showing a wiper blade of the other example.

A vehicle wiper 61 of the case shown in FIGS. 10 and 11 includes a wiper arm 52 and a wiper blade 62. The wiper blade 62 includes a backing 63, which has a length that is substantially the same as that of the blade rubber 55 and is crotched. The backing 63 is made of a metal plate material, which has a spring property. The backing 63 has a resiliency in a plate thickness direction. The crotched backing 63 is installed into the installation grooves 55b of the blade rubber 55 in the longitudinal direction. A connecting portion 63a, which is provided to directly connect (i.e., to connect without using the lever assembly 54) with the wiper arm 52, is integrally formed or is integrally assembled in the longitudinal center of the backing 63. A resin center cap 64, which covers a surround area around the connecting portion 63a, is installed to the backing 63 around the connecting portion 63a. Two rubber caps 65 are respectively installed on the opposite longitudinal sides of the center cap 64 at a counter blade rubber 55 side of the backing 63. Each rubber cap 65 extends to the corresponding end of the backing 63, and a fin 65a, which limits lifting of the wiper blade 62 from the glass surface 50a, is formed integrally in each rubber cap 65. Resin end caps 66 are installed to the ends of the rubber caps 65 and the ends of the backing 63. Even in the wiper blade 62 of the above configuration, similar to the above embodiment, it is possible to apply the above setting method, which sets the curvature (the radius of curvature) in the respective regions A1-An of the backing 63. The configuration of the wiper blade 62 is not limited to the above one and can be modified in any appropriate manner.

In the above embodiment, the curvature of each backing 56 (56a, 56b) is changed in the respective regions A1-An. Alternatively, a width and/or a plate thickness of the backing 56 (56a, 56b) may be changed in the respective regions A1-An to change the rigidity thereof. Furthermore, the curvature and the rigidity of the backing 56 (56a, 56b) may be both changed. Even with this modification, advantages similar to those of the above embodiment can be achieved.

In the above embodiment, the sum of the variation differences of the contact pressures Fyij is set to be the sum of absolute values of the differences, each of which is between the contact pressure Fyij at the corresponding one of the discretized points Pij and the reference value Fy0, or is set to be the sum of squares of the differences, each of which is between the contact pressure Fyij at the corresponding one of the discretized points Pij and the reference value Fy0. Alternative to the above ones, the sum of the variation differences of the contact pressures Fyij may be obtained through any other appropriate manner.

In the above embodiment, the sum of the variation differences of the contact pressures Fyij is the sum of the variation differences of the contact pressures Fyij computed for the round-trip of the wiper blade 53 (53a, 53b) in the wiping direction. Alternatively, the sum of the variation differences of the contact pressures Fyij may be a sum of variation differences of the contact pressures Fyij computed only for the forward stroke or the backward stroke of the round-trip of the wiper blade 53 (53a, 53b).

In the above embodiment, the discretization of the wiping area B of the wiper blade 53 (53a, 53b) is implemented such that the equal intervals are provided in the wiping direction of the wiper blade 53 (53a, 53b), and the equal intervals are provided in the longitudinal direction of the wiper blade 53 (53a, 53b). However, at least one of the equal intervals in the wiping direction of the wiper blade 53 (53a, 53b) and the equal intervals in the longitudinal direction of the wiper blade 53 (53a, 53b) may be made as unequal intervals.

(7) In the above embodiment, the virtual regional divisions of the backing 56 (56a, 56b) is made at equal intervals in the longitudinal direction. However, this virtual regional divisions of the backing 56 (56a, 56b) may be made at unequal intervals in the longitudinal direction.

In the above embodiment, the pair of backings 56 is used. Alternatively, the backings 56 may be made as an integral backing.

In the above embodiment, the vehicle wiper 51, which wipes the glass surface 50a of the front glass 50, is described. However, the present invention may be implemented in a wiper of any other one that is other than the vehicle. Furthermore, the present invention may be implemented in a wiper that wipes a wiping surface other than the glass surface 50a.

According to the invention, there are provided the wiper blade partial pressure setting method and the wiper blade, easily and reliably improving the wiping performance over the entire wiping area of the wiping surface.

The invention claimed is:

1. A wiper blade partial pressure setting method for a wiper blade that includes a backing, which is received in a blade rubber that wipes a wiping surface, wherein the backing spreads an urging force applied from a wiper arm toward the wiping surface in a longitudinal direction of the blade rubber to unify contact pressures of the blade rubber against the wiping surface, the wiper blade partial pressure setting method comprising:
   virtually dividing the backing into a plurality of regions in a longitudinal direction of the backing;
   discretizing a wiping area of the wiper blade in the wiping surface in a wiping direction of the wiper blade and in a longitudinal direction of the wiper blade; and
   setting at least one of a curvature and a rigidity of each of the plurality of virtually divided regions of the backing in such a manner that a sum of variation differences of the contact pressures at respective discretized points is minimized.

2. The wiper blade partial pressure setting method according to claim 1, wherein
   the sum of the variation differences of the contact pressures is:
   a sum of absolute values of differences, each of which is between the contact pressure at a corresponding one of the discretized points and a reference value; or
   a sum of squares of the differences, each of which is between the contact pressure at the corresponding one of the discretized points and the reference value.

3. The wiper blade partial pressure setting method according to claim 1, further comprising
   weighting according to the variation differences of the contact pressures.

4. The wiper blade partial pressure setting method according to claim 1, wherein
   the sum of the variation differences of the contact pressures is a sum of the variation differences of the contact pressures computed for a round-trip of the wiper blade in the wiping direction.

5. The wiper blade partial pressure setting method according to claim 1, wherein
the discretizing of the wiping area of the wiper blade includes:
dividing the wiping area into equal intervals in the wiping direction of the wiper blade; and
dividing the wiping area into equal intervals in the longitudinal direction of the wiper blade.

6. The wiper blade partial pressure setting method according to claim 1, wherein
the virtually dividing of the backing includes dividing the backing into equal intervals in the longitudinal direction of the backing.

* * * * *